(12) United States Patent
Zhao et al.

(10) Patent No.: US 12,150,071 B2
(45) Date of Patent: Nov. 19, 2024

(54) METHOD FOR TRANSMITTING SIDELINK DATA, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, Victoria (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 498 days.

(21) Appl. No.: 17/551,160

(22) Filed: Dec. 14, 2021

(65) Prior Publication Data
US 2022/0110074 A1    Apr. 7, 2022

Related U.S. Application Data

(63) Continuation of application No. PCT/CN2019/100168, filed on Aug. 12, 2019.

(51) Int. Cl.
*H04W 52/36* (2009.01)
*H04W 52/14* (2009.01)
(Continued)

(52) U.S. Cl.
CPC ....... *H04W 52/367* (2013.01); *H04W 52/143* (2013.01); *H04W 52/241* (2013.01); *H04W 52/365* (2013.01); *H04W 92/18* (2013.01)

(58) Field of Classification Search
CPC ............. H04W 52/367; H04W 52/143; H04W 52/365; H04W 52/241; H04W 92/18
See application file for complete search history.

(56) References Cited

U.S. PATENT DOCUMENTS

| 2020/0229105 A1* | 7/2020 | Cai ..................... H04W 52/242 |
| 2021/0045063 A1* | 2/2021 | Akkarakaran ...... H04W 52/367 |

FOREIGN PATENT DOCUMENTS

| CN | 109257810 | 1/2019 |
| CN | 110115068 | 8/2019 |

(Continued)

OTHER PUBLICATIONS

"International Search Report (Form PCT/ISA/210) of PCT/CN2019/100168," mailed on Apr. 26, 2020, with English translation thereof, pp. 1-7.

(Continued)

*Primary Examiner* — Justin Y Lee
(74) *Attorney, Agent, or Firm* — JCIP GLOBAL INC.

(57) ABSTRACT

A method for transmitting sidelink data, a terminal device, and a network device are provided. The method comprises: a first terminal device receives power indication information, the power indication information being used for indicating a power adjustment value; the first terminal device adjusts, according to the power adjustment value, transmission power for transmitting sidelink data or a sidelink reference signal to a second terminal device. The method for transmitting sidelink data, the terminal device, and the network device ensure that a receiving terminal obtains a desired SINR when receiving sidelink data.

16 Claims, 4 Drawing Sheets

200 a first terminal device receives power indication information, and the power indication information is used to indicate a power adjustment value — S210 the first terminal device adjusts the transmission power for transmitting the sidelink data or the sidelink reference signal to the second terminal device according to the power adjustment value — S220

(51) Int. Cl.
*H04W 52/24* (2009.01)
*H04W 92/18* (2009.01)

(56) References Cited

FOREIGN PATENT DOCUMENTS

| | | |
|---|---|---|
| WO | 2016095119 | 6/2016 |
| WO | 2019126055 | 6/2019 |

OTHER PUBLICATIONS

"Written Opinion of the International Searching Authority (Form PCT/ISA/237) of PCT/CN2019/100168," mailed on Apr. 26, 2020, with English translation thereof, pp. 1-7.

* cited by examiner

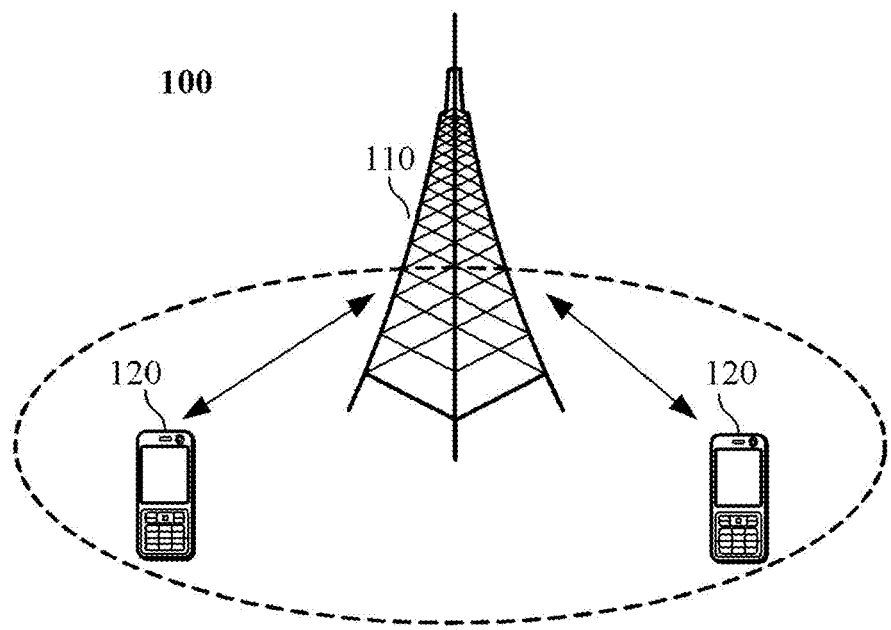
FIG. 1
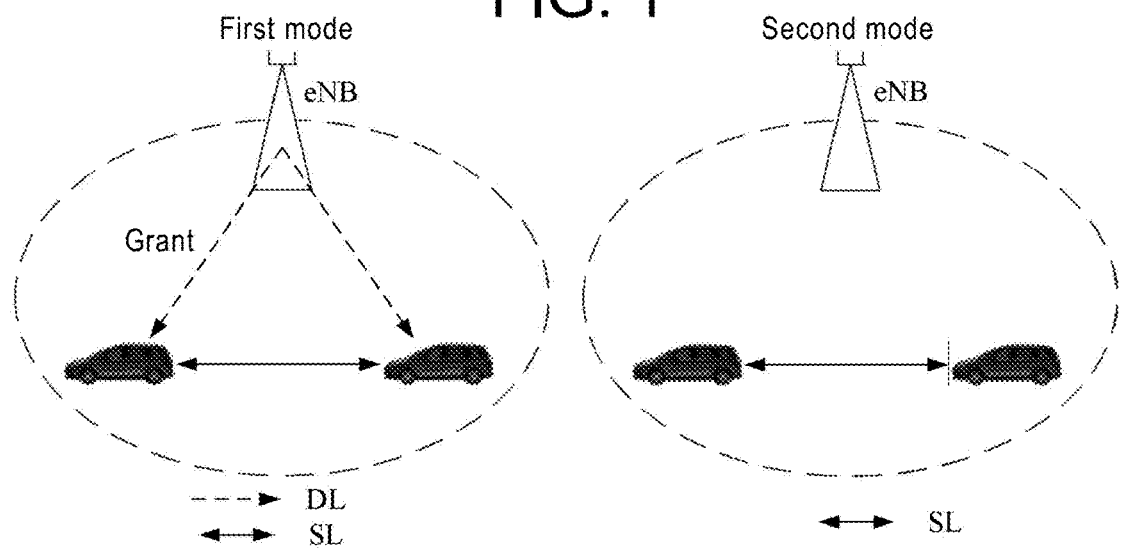
FIG. 2
FIG. 3

METHOD FOR TRANSMITTING SIDELINK DATA, TERMINAL DEVICE, AND NETWORK DEVICE

CROSS-REFERENCE TO RELATED APPLICATION

This application is a continuation of international PCT application serial no. PCT/CN2019/100168, filed on Aug. 12, 2019. The entirety of the above-mentioned patent application is hereby incorporated by reference herein and made a part of this specification.

BACKGROUND

Field of the Disclosure

This disclosure relates to the field of communications, in particular to a method for transmitting sidelink data, a terminal device and a network device.

Description of Related Art

In the field of New Radio (NR) Vehicle to Everything (V2X), the receiving terminal measures the Sidelink Reference Signal Received Power (SL-RSRP), and feeds the SL-RSRP back to the sending terminal, and the sending terminal determines the path loss of the sidelink according to its transmission power and the SL-RSRP feedback from the receiving terminal, and performs power control based on the path loss.

However, the interference condition at the receiving terminal and the interference condition at the sending terminal may be different. Therefore, the transmission power determined by the sending terminal according to the path loss cannot ensure that the receiving terminal can achieve the signal to interference plus noise ratio (SINR) required to demodulate the data, which is likely to cause the receiving terminal to fail to detect the data.

SUMMARY OF THE DISCLOSURE

The embodiment of the disclosure provides a method for transmitting sidelink data, a terminal device, and a network device to ensure that the receiving terminal obtains the desired SINR when receiving the sidelink data.

In the first aspect, a method for transmitting sidelink data is provided, including: a first terminal device receives power indication information, the power indication information is used to indicate a power adjustment value; the first terminal device adjusts the transmission power for transmitting the sidelink data or the first sidelink reference signal to the second terminal device according to the power adjustment value.

In the second aspect, a method for transmitting sidelink data is provided, including: a first terminal device receives power information transmitted by a second terminal device, the power information includes at least two of the following information of the first sidelink reference signal: sidelink reference signal received power, sidelink reference signal received quality, sidelink reference signal strength indicator, and SINR; the first terminal device determines the power adjustment value according to the power information; the first terminal device adjusts the transmission power for transmitting the sidelink data or the second sidelink reference signal to the second terminal device according to the power adjustment value.

In the aspect of third party, a method for transmitting sidelink data is provided, including: a second terminal device transmits power indication information to a first terminal device, the power indication information is used to indicate a power adjustment value, and the power adjustment value is used for the first terminal device to adjust the transmission power for transmitting sidelink data or the first sidelink reference signal; the second terminal device receives the sidelink data or the first sidelink reference signal that is transmitted by the transmission power adjusted by the first terminal device.

In the fourth aspect, a method for transmitting sidelink data is provided, including: a second terminal device receives a first sidelink reference signal transmitted by an initial transmission power adopted by a first terminal device; the second terminal device determines power information, and the power information includes at least one of the following information of the first sidelink reference signal: sidelink reference signal received power, sidelink reference signal received quality, sidelink reference signal strength indicator, and SINR; the second terminal device transmits the power information to the target device, and the power information is used for the target device to determine a power adjustment value, and the power adjustment value is used for the first terminal device to adjust the transmission power for transmitting sidelink data or second sidelink reference signal to the second terminal device, the target device includes at least one of the first terminal device, network device, and third terminal device, and the third terminal device is the head terminal of the communication group where the first terminal device and the second terminal device are located.

In the fifth aspect, a method for transmitting sidelink data is provided, including: a third terminal device transmits power indication information to a first terminal device, the power indication information is used to indicate a power adjustment value, and the power adjustment value is used for the first terminal device to adjust the transmission power for transmitting sidelink data or the first sidelink reference signal to the second terminal device, and the third terminal device is the head terminal of the communication group where the first terminal device and the second terminal device are located.

In the sixth aspect, a method for transmitting sidelink data is provided, including: a network device transmits power indication information to a first terminal device, the power indication information is used to indicate a power adjustment value, and the power adjustment value is used for the first terminal device to adjust the transmission power for transmitting sidelink data or the first sidelink reference signal to the second terminal device.

In the seventh aspect, a terminal device is provided, which is used to execute the method described in any one of the first to fifth aspects or other implementations thereof. Specifically, the terminal device includes a functional module for executing the method described in any one of the first to fifth aspects or other implementations thereof.

In the eighth aspect, a network device is provided, which is used to execute the method described in the sixth aspect or other implementations thereof. Specifically, the network device includes a functional module for executing the method described in the sixth aspect or other implementations thereof.

In the ninth aspect, a terminal device is provided, which includes a processor and a memory. The memory is used to store a computer program, and the processor is used to invoke and run the computer program stored in the memory to execute the method described in any one of the first to fifth aspects or other implementations thereof.

In the tenth aspect, a network device is provided, which includes a processor and a memory. The memory is used to store a computer program, and the processor is used to invoke and run the computer program stored in the memory to execute the method described in the sixth aspect or other implementations thereof.

In the eleventh aspect, a chip is provided for executing the method described in any one of the first to sixth aspects or other implementations thereof. Specifically, the chip includes: a processor, which is used to invoke and run a computer program in the memory, so that the device provided with the chip executes the method described in any one of the first to sixth aspects or other implementations thereof.

In the twelfth aspect, a computer-readable storage medium is provided for storing a computer program that enables the computer to execute the method described in any one of the first to sixth aspects or other implementations thereof.

In the thirteenth aspect, a computer program product is provided, which includes computer program instructions that enable a computer to execute the method described in any one of the first to sixth aspects or other implementations thereof.

In the fourteenth aspect, a computer program is provided. When the computer program is run on a computer, the computer is enabled to execute the method described in any one of the first to sixth aspects or other implementations thereof.

With the above technical solution, the terminal device at the receiving terminal, network device or head terminal device configures transmission power for the terminal device at the sending terminal according to the path loss of sidelink, SL-RSRP, Sidelink Reference Signal Received Quality (SL-RSRQ) and other information, which can ensure that the receiving terminal obtains the desired SINR when receiving the sidelink data or sidelink signals. Alternatively, the receiving terminal transmits SL-RSRP, SL-RSRQ, Sidelink Received Signal Strength Indicator (SL-RSSI), and other information to the sending terminal. The sending terminal can determine the SINR when the receiving terminal receives the sidelink data, and adjust the transmission power accordingly to ensure that the receiving terminal obtains the desired SINR when receiving the sidelink data.

BRIEF DESCRIPTION OF THE DRAWINGS

FIG. 1 is a schematic diagram of a communication system architecture embodied in an embodiment of the disclosure.

FIG. 2 is a schematic diagram of a V2X system architecture embodied in an embodiment of the disclosure.

FIG. 3 is a schematic flowchart of a method for transmitting sidelink data embodied in an embodiment of the disclosure.

DESCRIPTION OF EMBODIMENTS

Figure 4:
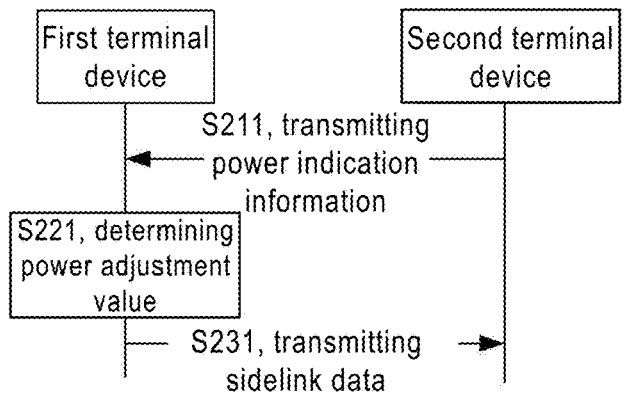
FIG. 4 is another schematic diagram of a method for transmitting sidelink data embodied in an embodiment of the disclosure.

The technical solutions in the embodiments of the present disclosure will be described below in conjunction with the drawings in the embodiments of the present disclosure. Clearly, the described embodiments are a part of the embodiments of the present disclosure, not all of the embodiments. Based on the embodiments in this disclosure, all other embodiments obtained by those of ordinary skill in the art without creative work shall fall within the protection scope of this disclosure.

The technical solutions in the embodiments of the disclosure can be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or 5G system, etc.

Exemplarily, the communication system 100 applied in the embodiment of the disclosure is shown in FIG. 1. The communication system 100 may include a network device 110, and the network device 110 may be a device that communicates with a terminal device 120 (or referred to as a communication terminal or a terminal). The network device 110 can provide communication coverage for a specific geographic area, and can communicate with a terminal device located in the coverage area. Optionally, the network device 110 may be a Base Transceiver Station (BTS) in a GSM system or a CDMA system, a NodeB (NB) in a WCDMA system, or an Evolutional Node B (eNB or eNodeB) in an LET system, or a wireless controller in the Cloud Radio Access Network (CRAN), or the network device can be a mobile switching center, a relay station, an access point, a vehicle on-board device, wearable devices, hubs, switches, bridges, routers, network-side devices in 5G networks, or network devices in the future evolution public land mobile network (PLMN), etc.

The communication system 100 further includes at least one terminal device 120 located within the coverage area of the network device 110. As used herein, "terminal device" includes, but is not limited to, connection via wired lines, such as via Public Switched Telephone Networks (PSTN), Digital Subscriber Line (DSL), digital cable, and direct cable connection; and/or another data connection/network; and/or via a wireless interface, such as directed at cellular networks, wireless local area networks (WLAN), digital television networks such as DVB-H networks, satellite network, AM-FM broadcast transmitter; and/or another terminal device that is set to receive/send communication signals; and/or Internet of Things (IoT) equipment. A terminal device set to communicate via a wireless interface can be called a "wireless communication terminal", a "wireless terminal" or a "mobile terminal". Examples of mobile terminals include, but are not limited to, satellite or cellular phones; Personal Communications System (PCS) terminals that can be combined with cellular radio phones with data processing, fax, and have data communication capabilities; can include radio phones, pagers, and the Internet/Intranet access, Web browser, memo pad, calendar, and/or PDA with Global Positioning System (GPS) receiver; and conventional laptop and/or palmtop receiver or include other electronic devices including radio phone transceiver. The terminal device can refer to access terminal, user equipment (UE), user unit, user station, mobile station, mobile stage, remote station, remote terminal, mobile equipment, user terminal, terminal, wireless communication equipment, user agent or user device. The access terminal can be a cellular phone, a cordless phone, a Session Initiation Protocol (SIP) phone, a wireless local loop (WLL) station, a personal digital assistant (PDA), and handheld devices having wireless communication function, computing devices, or other processing devices connected to wireless modems, vehicle on-board devices, wearable devices, terminal devices in 5G networks, or terminal devices in the future evolution PLMN, etc.

Optionally, Device to Device (D2D) communication may be performed between the terminal devices 120.

Optionally, the 5G system or 5G network may also be referred to as a New Radio (NR) system or NR network.

FIG. 1 exemplarily shows a network device 110 and two terminal devices 120. Optionally, the communication system 100 may include multiple network devices 110 and the coverage of each network device 110 may include different numbers of terminal devices 120. The disclosure is not limited thereto.

Optionally, the communication system 100 may further include other network entities such as a network controller and a mobility management entity, the disclosure provides no limitation thereto.

It should be understood that the devices with communication functions in the network/system in the embodiments of the disclosure may be referred to as communication devices. Taking the communication system 100 shown in FIG. 1 as an example, the communication device may include a network device 110 and a terminal device 120 with communication functions. The network device 110 and the terminal device 120 may be the specific devices described above, and no further description is incorporated herein. The communication device may further include other devices in the communication system 100, such as network controllers, mobility management entities, and other network entities, the disclosure provides no limitation thereto.

It should be understood that the terms "system" and "network" in this disclosure are often used interchangeably. The term "and/or" in this disclosure is adopted only to describe an association relationship between related objects, which means that there can be three types of relationships. For example, A and/or B can mean that there is A alone, A and B exist simultaneously, and there is B alone. In addition, the symbol "/" in this disclosure generally indicates that the related objects described before and after "/" are in an "or" relationship.

The V2X system is a type of sidelink (SL) transmission technology based on D2D. The V2X system is different from the conventional LTE system in which the communication data is received or sent through the base station. The V2X system adopts terminal-to-terminal communication, and therefore has a higher spectral efficiency and lower transmission delay.

Two side transmission modes are defined in the 3rd Generation Partnership Project (3GPP): the first mode and the second mode.

The first mode: As shown in FIG. 2, transmission of resources at the terminal is performed through allocation or grant by the base station through the downlink (DL). The terminal transmits data on the sidelink according to the resources allocated by the base station. The base station can allocate resources in a single transmission for the terminal, and can also allocate resources in semi-static transmission for the terminal.

The second mode: As shown in FIG. 2, the terminal can select a resource in the resource pool for data transmission. Specifically, the terminal may select resources for transmission from the resource pool by means of listening, or select resources for transmission from the resource pool by means of random selection.

In 3GPP, D2D is divided into different stages for research, for example, including the V2X research. In version 14/15 (Rel-14/15), research has been conducted by the V2X system in the condition of vehicle-to-vehicle communication, and the research is mainly oriented to the business related to vehicle-to-vehicle and vehicle-to-person communication with relatively high-speed movement.

In NR-V2X, support for automatic driving is required, so higher requirements are set for data interaction between vehicles, such as higher throughput, lower delay, higher reliability, larger coverage, more flexible resource allocation, etc.

In the NR-V2X system, a variety of transmission modes are introduced, mode 1 and mode 2. Specifically, in mode 1, the network allocates resources to be transmitted for the terminal (that is, the first mode above). In mode 2, the terminal selects resources to be transmitted (that is, the second mode above).

In addition, sidelink power control is also introduced to NR-V2X. The receiving terminal measures SL-RSRP and feeds the SL-RSRP back to the sending terminal. The sending terminal determines the path loss of sidelink according to its transmission power and the SL-RSRP fed back by the receiving terminal, and performs power control according to the path loss.

In the existing power control, the sending terminal determines the transmission power according to the path loss of the sidelink, but the interference condition of the receiving terminal and the interference condition of the sending terminal may be different. Therefore, the transmission power determined by the sending terminal according to the path loss cannot ensure that the receiving terminal can reach the SINR required to demodulate the data, which may cause the receiving terminal to fail to detect the data.

Therefore, the embodiment of the disclosure provides a method for transmitting sidelink data, which can solve the problem mentioned above.

It should be understood that the embodiments of the disclosure can be applied to a V2X system, and can also be applied to any D2D system.

FIG. 3 is a schematic flowchart of a method 200 for transmitting sidelink data according to an embodiment of the disclosure. The method 200 may be executed by any terminal device. For ease of description, the terminal device is referred to as the first terminal device. For example, the first terminal device may be the terminal device 120 as shown in FIG. 1. As shown in FIG. 3, the method 200 includes: step S210, a first terminal device receives power indication information, and the power indication information is used to indicate a power adjustment value; step S220, the first terminal device adjusts the transmission power for transmitting the sidelink data or the first sidelink reference signal to the second terminal device according to the power adjustment value.

It should be understood that the first terminal device and the second terminal device in the embodiment of the disclosure can refer to any two terminal devices that transmit sidelink. For example, the first terminal device or the second terminal device can refer to any terminal device shown in FIG. 1 and FIG. 2, the disclosure provides no limitation thereto.

It should be understood that the first sidelink reference signal in the embodiment of the disclosure may be any sidelink reference signal. For example, the first sidelink reference signal may be a demodulation reference signal (DMRS) of a physical sidelink control channel (PSCCH). Alternatively, the first sidelink reference signal may also be a DMRS of physical sidelink shared channel (PSSCH). Alternatively, the first sidelink reference signal may also be a channel state information reference signal (CSI-RS), but the disclosure is not limited thereto.

It should be understood that, in step S210, the first terminal device receives power indication information, and the power indication information may be transmitted by a network device or other terminal devices. The various embodiments of the disclosure will be described in detail below in combination with different situations of step S210.

Optionally, as a first embodiment, the step S210 may specifically include: the first terminal device receives the power indication information transmitted by the second terminal device. Specifically, FIG. 4 shows another schematic diagram of a method 200 for transmitting sidelink data according to an embodiment of the disclosure. As shown in FIG. 4, corresponding to step S210 of the method 200 in FIG. 3, the method 200 may include: step S211, transmitting power indication information, that is, the second terminal device transmits power indication information to the first terminal device, and the power indication information is used to indicate power adjustment value.

Optionally, the second terminal device can determine the power adjustment value based on the sidelink data or the sidelink reference signal transmitted by the first terminal device. Specifically, before step S211, the method 200 further includes: the first terminal device uses the initial transmission power to transmit a sidelink reference signal to the second terminal device. For the purpose of distinction, the sidelink reference signal is called the second sidelink reference signal. The second sidelink reference signal is used for the second terminal device to determine the power adjustment value.

It should be understood that the second sidelink reference signal may be any sidelink reference signal, for example, the second sidelink reference signal may be PSCCH-DMRS; or, the second sidelink reference signal may also be PSSCH-DMRS; or, the second sidelink reference signal may also be a CSI-RS, but the disclosure is not limited thereto.

Specifically, the first terminal device uses the initial transmission power to transmit the second sidelink reference signal to the second terminal device. When the first terminal device and the second terminal device perform the first data transmission, the initial transmission power can be determined by the first terminal device through any one of the following methods: the initial transmission power is the maximum transmission power of the first terminal device; the initial transmission power is configured by the network device for the first terminal device, for example, the network device configures the maximum transmission power for the first terminal device; the initial transmission power can also be determined by the first terminal device according to the current channel busy ratio (CBR); the initial transmission power can also be the transmission power determined by the first terminal device according to the path loss of the downlink. It should be understood that the initial transmission power is the transmission power used by the first terminal device before acquiring the power adjustment value.

When the second terminal device receives the second sidelink reference signal transmitted by the first terminal device, the relevant reception parameters of the second sidelink reference signal can be determined. For example, the second terminal device can determine power information according to the second sidelink reference signal. The power information may include at least one of the following information of the second sidelink reference signal: SL-RSRP of the second sidelink reference signal, the sidelink reference signal received quality (SL-RSRQ) of the second sidelink reference signal, the Sidelink Received Signal Strength Indicator (SL-RSSI) of the second sidelink reference signal and the SINR of the received second sidelink reference signal.

The second terminal device can determine the power adjustment value according to the power information. For example, the second terminal device may determine the SINR of the received second sidelink reference signal according to the power information; the second terminal device may determine the power adjustment value according to the desired target SINR (SINR_target) to be received.

It should be understood that the power adjustment value in the embodiment of the disclosure may be a specific value, or the power adjustment value may also include a power adjustment range. The first terminal device may determine the transmission power based on the power adjustment range, the disclosure is not limited thereto.

For example, the second terminal device can determine the SINR (denoted as SINR_rx) of the second sidelink reference signal transmitted by the first terminal device through measurement; and then determine the power value $\Delta P$ that the first terminal device needs to adjust according to the desired to be received SINR_target, $\Delta P = SINR\_target - SINR\_rx$, and transmit the adjustment value $\Delta P$ as the power adjustment value to the first terminal device.

It should be understood that the power indication information in the embodiment of the disclosure is used to indicate the power adjustment value, and may include any of the following situations: the power indication information may include the index of the power adjustment value; or, the power indication information may also include the power adjustment value itself; or, the power indication information may also include the quantized value of the power adjustment value. In addition, the power adjustment value indicated by the power indication information may be an adjustment value when the first terminal device determines the transmission power, or the power adjustment value may also refer to the transmission power after the first terminal device makes the adjustment. For example, the power adjustment value may refer to the adjustment value $\Delta P$ mentioned above; or, the power indication information may also include the first SINR determined by the second terminal device and/or the SINR expected by the second terminal device, so that the first terminal device determines the adjustment value $\Delta P$ according to the difference between the two, and further determines the transmission power. Alternatively, the power adjustment value included in the power indication information may also be the value of the transmission power after adjustment, that is, the second terminal instructs the first terminal to use the power adjustment value to transmit the sidelink data or the sidelink signal, the disclosure is not limited thereto.

For example, taking the power adjustment value ΔP to be adjusted as an example, the power indication information may include an index value, and the corresponding power adjustment value can be determined through the index value. Specifically, the power indication information can occupy one or two bits. For example, assuming that the power indicator information occupies 2 bits, the relationship between the power adjustment value that the power indicator information can indicate and the corresponding index can be as described as in Table 1.

TABLE 1

| Value of power indication information | Adjusted power value (dB) |
|---|---|
| 0 | 2 |
| 1 | 0 |
| 2 | −1 |
| 3 | −2 |

In Table 1, an adjusted power value 0 dB means that the power remains unchanged, a power value greater than 0 dB means that the transmission power is increased, and a power value less than 0 dB means that the transmission power is reduced.

Optionally, the corresponding relationship between the index value and the adjusted power value may be predefined and configured by the network device, or may also be configured by the head terminal in the communication group where the first terminal device and the second terminal device are located.

In another example, the power indication information includes the power adjustment value ΔP that needs to be adjusted, and the first terminal determines the adjusted transmission power according to the power adjustment value ΔP and the transmission power used last time. Specifically, for example, the power adjustment value ΔP is 6 dB, and the transmission power used by the first terminal last time is 15 dB, then the adjusted transmission power is 6 dB+15 dB=21 dB, that is, the first terminal transmits sidelink data or sidelink reference signal at 21 dB.

In another example, the power indication information including the power adjustment value may also include the adjusted power, that is, the power adjustment value is the transmission power of the first terminal. Specifically, for example, the power adjustment value is 18 dB, and the first terminal obtains the power indication information, thereby determining that the next transmission power for transmitting the sidelink data or sidelink signal is 18 dB.

Optionally, in step S211, the second terminal device transmits the power indication information to the first terminal device, and the power indication information may be Transmission Power Control (TPC). The power indication information may be carried in the sidelink control information (SCI) transmitted by the second terminal device to the first terminal device. Optionally, in step S211, the power indication information transmitted by the second terminal device to the first terminal device may be carried in the PSSCH transmitted by the second terminal device to the first terminal device. For example, the power indication information may be carried through a Media Access Control (MAC) Control Element (CE) or Sidelink Radio Resource Control (SL-RRC) singling.

It should be understood that the method 200 may further include: the first terminal device receives at least one sidelink channel quality indicator (CQI) transmitted by the second terminal device, and the power indication information transmitted by the second terminal device and received by the first terminal device may include at least one power adjustment value corresponding to each sidelink CQI in the at least one sidelink CQI. For example, transmission of sidelink can support a maximum of layer 2 or layer 4 data transmission. The second terminal device of the receiving terminal can feed back the rank indicator (RI) and CQI to the first terminal device of the sending terminal. Simultaneously, the second terminal device can also feedback the same or different power adjustment values corresponding to different CQIs. For example, the second terminal device transmits two CQIs to the first terminal device, namely CQI1 and CQI2, corresponding to ranks equal to 1 and 2, respectively. In addition, the second terminal device transmits two power adjustment values to the first terminal device, and the two power adjustment values correspond to CQI1 and CQI2 respectively.

As shown in FIG. 4, corresponding to step S220 of the method 200 in FIG. 3, the method 200 may include: step S221, determining a power adjustment value, that is, the first terminal device determines the power adjustment value according to the power indication information transmitted by the second terminal device.

Specifically, according to the description in step S211, the method in which the power indication information indicates the power adjustment value may include any of a variety of situations. Therefore, in step S221, the first terminal device may determine the corresponding power adjustment value according to the power indication information. For example, the power indication information may include the index of the power adjustment value, and the first terminal device may determine the power adjustment value corresponding to the index value included in the power indication information according to the corresponding relationship between the power adjustment value and the index, for example, as shown in Table 1.

In another example, if the power indication information may also include the quantized value of the power adjustment value, the first terminal device may determine the corresponding power adjustment value through quantization processing.

As shown in FIG. 4, the method 200 may include: step S231, transmitting sidelink data, that is, the first terminal device adjusts the transmission power according to the power adjustment value determined in step S221, and uses the adjusted transmission power to transmit the sidelink data or the first sidelink reference signal to the second terminal device.

Specifically, if the power adjustment value is a certain specific value, the first terminal device can determine the transmission power according to the value; if the power adjustment value is within a certain range, the first terminal device can select an appropriate value within the range to determine the transmission power, and the disclosure is not limited thereto.

In addition, the first terminal device determines the transmission power based on the meaning of the power adjustment value. For example, if the power adjustment value is the adjustment value required when the first terminal device determines the transmission power, the first terminal device increases or decreases the current power value according to the power adjustment value to obtain the transmission power. Or, the power adjustment value indicated by the power indication information may also be the adjusted transmission power value, and the first terminal device may determine the power adjustment value as the transmission power value used for transmitting the sidelink data or the sidelink reference signal.

In this embodiment of the disclosure, the first terminal device uses the initial transmission power to transmit the second sidelink reference signal. Correspondingly, in the step S231, the first terminal device can adjust the initial transmission power according to the determined power adjustment value, for example, by increasing or decreasing the initial transmission power, or adjust the initial transmission power to the power adjustment value indicated by the power indication information, and use the adjusted transmission power to transmit the sidelink data or the first sidelink reference signal to the second terminal device. Therefore, in the embodiment of the disclosure, the receiving terminal determines the power adjustment value according to the measured SINR and the desired SINR, and instructs the sending terminal to perform power adjustment, so as to ensure that the receiving terminal obtains the desired SINR when receiving the sidelink data or the sidelink signal.

Figure 5:
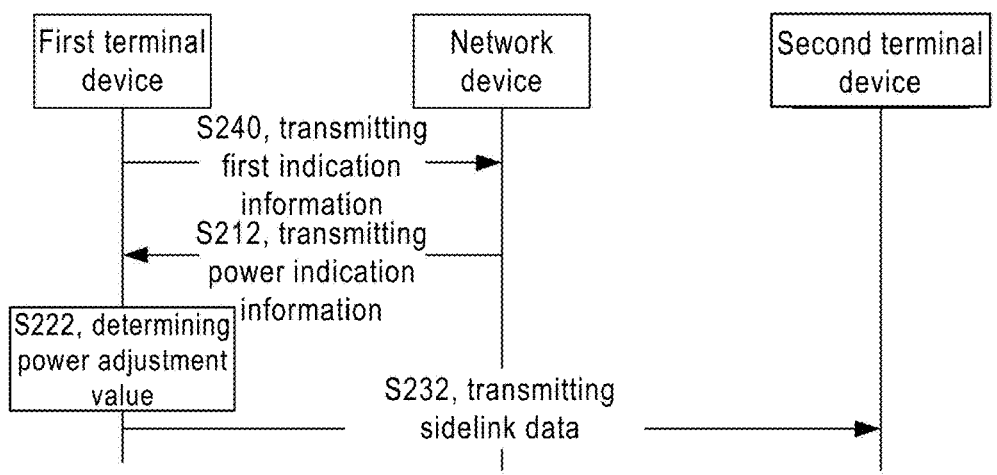
FIG. 5 is still another schematic diagram of a method for transmitting sidelink data embodied in an embodiment of the disclosure.

Optionally, as the second embodiment, the step S210 may specifically include: the first terminal device receives the power indication information transmitted by the network device. Specifically, FIG. 5 shows another schematic diagram of a method 200 for transmitting sidelink data according to an embodiment of the disclosure. As shown in FIG. 5, corresponding to step S210 of the method 200 in FIG. 3, the method 200 may include: step S212, transmitting power indication information, that is, the network device transmits power indication information to the first terminal device, and the power indication information is used to indicate power adjustment value.

Optionally, the network device may transmit downlink control information (DCI) to the first terminal device. The DCI includes the power indication information, but disclosure is not limited thereto. For example, in the case that the network device dynamically allocates transmission resources for the first terminal device, the network device may indicate the sidelink transmission resources of the first terminal device through DCI, and the DCI may further include the power indication information of the first terminal device.

Optionally, if the network device configures transmission resources for the first terminal device through configuring grant, the configuration grant information may also include power indication information of the first terminal device.

It should be understood that before step S212, the method 200 may further include: step S240, transmitting first indication information, that is, the first terminal device may transmit first indication information to the network device, and the first indication information includes at least one of the following information: SL-RSRP, SL-RSRQ, SL-RSSI, SINR, and power headroom report, so that the network device can determine the power adjustment value based on the first indication information. Specifically, the first indication information may be related parameters of the sidelink reference signal received by the first terminal device, or the power parameter may also be related parameters of the sidelink reference signal received by the second terminal device, that is, the network device may determine the power adjustment value of the first terminal device according to relevant parameters of the sidelink reference signal received by the first terminal device or the second terminal device.

Specifically, as the first case, the step S240 may include: the first terminal device transmits first indication information to the network device, and the first indication information is used by the network device to determine the power adjustment value. The first indication information may include parameters of the sidelink reference signal received by the second terminal device and transmitted by the first terminal device.

Specifically, the first terminal device uses the initial transmission power to transmit the sidelink reference signal to the second terminal device. For the purpose of distinction, the sidelink reference signal is called the fourth sidelink reference signal, so that the second terminal device can determine the parameter information of the fourth sidelink reference signal. The parameter information of the fourth sidelink reference signal determined by the second terminal device may include at least one of the following information of the fourth sidelink reference signal: SL-RSRP of the fourth sidelink reference signal, SL-RSRQ of the fourth sidelink reference signal, SL-RSSI of the fourth sidelink reference signal, and SINR of the fourth sidelink reference signal.

It should be understood that the fourth sidelink reference signal may be any sidelink reference signal. For example, the fourth sidelink reference signal may be PSCCH-DMRS; or, the fourth sidelink reference signal may also be PSSCH-DMRS; or, the fourth sidelink reference signal may also be SL CSI-RS, but the disclosure is not limited thereto.

The second terminal device can transmit second indication information to the first terminal device, and the second indication information includes parameter information of the fourth sidelink reference signal, so that the first terminal device transmits the first indication information to the network device based on the second indication information. For example, the second indication information may include at least one of the following information of the fourth sidelink reference signal determined by the second terminal device: SL-RSRP, SL-RSRQ, SL-RSSI, and SINR. Correspondingly, the first indication information may include at least one of the parameter information of the fourth sidelink reference signal, for example, the first indication information may include at least one of the following information of the fourth sidelink reference signal: SL-RSRP, SL-RSRQ, SL-RSSI, and SINR. In addition, the first indication information may further include a power headroom report of the first terminal device. The network device determines the power adjustment value of the first terminal device according to the first indication information.

Alternatively, the first terminal device may not perform step S240, and the second terminal device may directly transmit the parameter information of the fourth sidelink reference signal to the network device; or, the second terminal device may transmit the parameter information of the fourth sidelink reference signal to the network device through other methods, so that the network device can determine the power adjustment value of the first terminal device according to the parameter information of the fourth sidelink reference signal.

It should be understood that the first terminal device uses the initial transmission power to transmit the fourth sidelink reference signal to the second terminal device. When the first terminal device and the second terminal device perform the first data transmission, the initial transmission power can be determined by the first terminal device through any one of the following methods: the initial transmission power is the maximum transmission power of the first terminal device; the initial transmission power is configured by the network device for the first terminal device, for example, the network device may configure the maximum transmission power for the first terminal device; the initial transmission power may also be determined by the first terminal device according to the current CBR; the initial transmission power may also be the transmission power determined by the first terminal device according to the downlink path loss. It should be understood that the initial transmission power is the transmission power used before the first terminal device obtains the power adjustment value.

Optionally, as a second case, the step S240 may include: the first terminal device transmits first indication information to the network device, and the first indication information is used for the network device to determine the power adjustment value. The first indication information may include parameters of the third sidelink reference signal received by the first terminal device and transmitted by the second terminal device.

Specifically, the first terminal device receives the third sidelink reference signal transmitted by the second terminal device; the first terminal device determines the first indication information according to the third sidelink reference signal, and the first indication information may include at least one of the following information of the third sidelink reference signal: SL-RSRP of the third sidelink reference signal, SL-RSRQ of the third sidelink reference signal, SL-RSSI of the third sidelink reference signal, and SINR of the third sidelink reference signal. The network device determines the power adjustment value of the first terminal device according to the first indication information.

It should be understood that the third sidelink reference signal may be any sidelink reference signal, for example, the third sidelink reference signal may be PSCCH-DMRS; or, the third sidelink reference signal may also be PSSCH-DMRS; or the third sidelink reference signal may also be SL CSI-RS, but the disclosure is not limited thereto.

It should be understood that in the above two cases, the network device receives the first indication information, and the network device can determine the power adjustment value. For example, if the first indication information includes related parameters of the fourth sidelink reference signal, the network device can determine the SINR of the sidelink reference signal according to the first indication information, for example, by calculating the SINR of the corresponding sidelink reference signal according to the SL-RSRP in the first indication information combined with SL-RSRQ and/or SL-RSSI. The network device can determine the power adjustment value according to the SINR expected by the terminal device at the receiving terminal. In another example, if the first indication information includes related parameters of the third sidelink reference signal, the network device can determine the SINR of the sidelink reference signal according to the first indication information, for example, by calculating the SINR of the corresponding sidelink reference signal according to the SL-RSRP in the first indication information combined with SL-RSRQ and/or SL-RSSI. The network device combines the SINR and the transmission power of the terminal device at the receiving terminal to determine the power adjustment value, for example, the power adjustment value represents the value of the transmission power to be increased or decreased when the first terminal device transmits the sidelink data.

Optionally, the first terminal device transmits power headroom report (PHR) to the network device. The PHR may indicate the value range within which the transmission power of the first terminal device can be increased or decreased, so as to facilitate the network device to determine the power adjustment value of the first terminal device according to the information.

It should be understood that the power adjustment value determined by the network device in the above two cases is similar to step S211. In step S212, the network device indicates the power adjustment value through the power indication information transmitted to the first terminal device. The power adjustment value may be a specific value, or the power adjustment value may also include a power adjustment range, and the first terminal device may determine the transmission power based on the power adjustment range, and the disclosure is not limited thereto.

In addition, similar to step S211, in step S212, the power indication information in the embodiment of the disclosure is used to indicate the power adjustment value, which may include any of the following situations: the power indication information may include the index of the power adjustment value; or, the power indication information may also include the power adjustment value itself, or, the power indication information may also include the quantized value of the power adjustment value. In addition, the power adjustment value indicated by the power indication information may be an adjustment value required when the first terminal device determines the transmission power, that is, the first terminal device increases or decreases the current power value to obtain the transmission power according to the power adjustment value; or, the power adjustment value indicated by the power indication information may also be the adjusted transmission power value, that is, the network device instructs the first terminal device to transmit the transmission power value used by the sidelink data or the sidelink reference signal through the power indication information, and the disclosure is not limited thereto.

As shown in FIG. 5, corresponding to step S220 of the method 200 in FIG. 3, the method 200 may include: step S222, determining the power adjustment value, that is, the first terminal device determines the power adjustment value according to the power indication information transmitted by the network device.

Specifically, according to the description in step S212, the method in which the power indication information indicates the power adjustment value may include any of a variety of situations. Therefore, in step S222, the first terminal device may determine the corresponding power adjustment value according to the indication method of the power indication information. For example, the power indication information may include the index of the power adjustment value, and the first terminal device may determine the power adjustment value corresponding to the index value included in the power indication information according to the corresponding relationship between the power adjustment value and the index.

In another example, if the power indication information may also include the quantized value of the power adjustment value, the first terminal device may determine the corresponding power adjustment value through quantization processing.

As shown in FIG. 5, the method 200 may include: step S232, transmitting sidelink data, that is, the first terminal device adjusts the transmission power according to the power adjustment value determined by step S212, and uses the adjusted transmission power to transmit the sidelink data or the first sidelink reference signal to the second terminal device.

Specifically, if the power adjustment value is a certain specific value, the first terminal device can determine the transmission power according to the value; if the power adjustment value is a certain range, the first terminal device can select an appropriate value within the range to determine the transmission power, and the disclosure is not limited thereto.

In addition, the first terminal device determines the transmission power based on the meaning of the power adjustment value. For example, if the power adjustment value is the adjustment value required when the first terminal device determines the transmission power, the first terminal device increases or decreases the current power value according to the power adjustment value to obtain the transmission power; or, the power adjustment value indicated by the power indication information may also be the adjusted transmission power value, and the first terminal device may determine the power adjustment value as the transmission power value used for transmitting the sidelink data or the sidelink reference signal.

In this embodiment of the disclosure, the first terminal device uses the initial transmission power to transmit the fourth sidelink reference signal. Correspondingly, in the step S232, the first terminal device can adjust the initial transmission power according to the determined power adjustment value, for example by increasing or decreasing the initial transmission power, or adjusting the initial transmission power to the power adjustment value indicated by the power indication information, and using the adjusted transmission power to transmit the sidelink data or the sidelink signal to the second terminal device.

Therefore, in the embodiment of this disclosure, the network device is used to configure the transmission power for the terminal device at the sending terminal according to the sidelink path loss, SL-RSRP, SL-RSRQ, SL-RSSI, SINR and other information reported by the terminal device, so as to ensure that the terminal device at the receiving terminal obtains the desired SINR when receiving the sidelink data or the sidelink signals.

Figure 6:
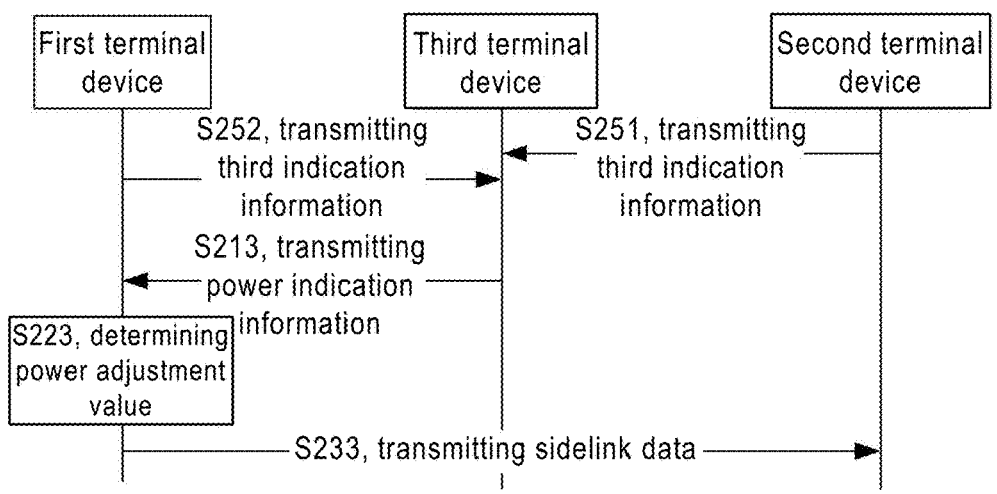
FIG. 6 is yet another schematic diagram of a method for transmitting sidelink data embodied in an embodiment of the disclosure.

Optionally, as a third embodiment, the step S210 may specifically include: the first terminal device receives the power indication information transmitted by a third terminal device. The third terminal device is the head terminal of the communication group where the first terminal device and the second terminal device are located. Specifically, FIG. 6 shows another schematic diagram of a method 200 for transmitting sidelink data according to an embodiment of the disclosure. As shown in FIG. 6, corresponding to step S210 of the method 200 in FIG. 3, the method 200 may include: step S213, transmitting power indication information, that is, the third terminal device transmits power indication information to the first terminal device, and the power indication information is used to indicate power adjustment value.

It should be understood that the third terminal device is the head terminal of the communication group where the first terminal device and the second terminal device are located. The head terminal refers to a terminal having the following functions in the communication group, for example, resource management, or resource coordination, or resource configuration. If the third terminal device and the first terminal device are the same terminal device, the first terminal device determines the power adjustment value. Please refer to the method 300 described in details below for the specific embodiment. If the third terminal device and the second terminal device are the same terminal device, the second terminal device determines the power adjustment value. Please refer to the description of the first embodiment of the method 200 for the specific embodiment. Therefore, in the third embodiment, the third terminal device, the first terminal device and the second terminal device are described as different terminal devices for exemplary description.

Optionally, the step in which the third terminal device transmits the power indication information to the first terminal device may include: the third terminal device transmits a sidelink channel to the first terminal device, and the sidelink channel includes the power indication information.

It should be understood that before step S213, the method 200 may further include: the first terminal device or the second terminal device transmits the third indication information to the third terminal device, and the third indication information includes at least one of the following information: SL-RSRP, SL-RSRQ, SL-RSSI, SINR, and power headroom report, so that the third terminal device determines the power adjustment value of the first terminal device based on the third indication information.

Optionally, as shown in FIG. 6, the step of transmitting the third indication information may include: step S251, transmitting the third indication information, that is, the third terminal device may receive the third indication information directly or indirectly transmitted by the second terminal device. Specifically, similar to the first case in step S240 in the second embodiment, the first terminal device uses the initial transmission power to transmit the fourth sidelink reference signal to the second terminal device; the second terminal device receives the fourth sidelink reference signal and determines the parameter information of the fourth sidelink reference signal. The parameter information of the fourth sidelink reference signal may include at least one of the following information of the fourth sidelink reference signal: SL-RSRP of the fourth sidelink reference signal, SL-RSRQ of the fourth sidelink reference signal, SL-RSSI of the fourth sidelink reference signal, and SINR of the fourth sidelink reference signal.

It should be understood that the fourth sidelink reference signal may be any sidelink reference signal, for example, the first sidelink reference signal may be PSCCH-DMRS; or, the first sidelink reference signal may also be PSSCH-DMRS; or, the fourth sidelink reference signal may also be an SL CSI-RS, but the disclosure is not limited thereto.

It should be understood that the first terminal device uses the initial transmission power to transmit the fourth sidelink reference signal to the second terminal device. When the first terminal device and the second terminal device perform the first data transmission, the initial transmission power can be determined by the first terminal device through any one of the following methods: the initial transmission power is the maximum transmission power of the first terminal device; the initial transmission power is configured by the network device for the first terminal device, for example, the network device may configure the maximum transmission power for the first terminal device; the initial transmission power may also be determined by the first terminal device according to the current CBR; the initial transmission power may also be the transmission power determined by the first terminal device according to the downlink path loss. It should be understood that the initial transmission power is the transmission power used before the first terminal device obtains the power adjustment value.

In step S251, the third terminal device receiving the third indication information transmitted by the second terminal device may specifically include: the third terminal device directly receives the third indication information transmitted by the second terminal device, and the third indication information may include at least one of the parameter information of the fourth sidelink reference signal, so that the third terminal device determines the power adjustment value of the first terminal device according to the third indication information.

Alternatively, in step S251, the third terminal device receiving the third indication information sent by the second terminal device may also specifically include: the third terminal device may receive the third indication information transmitted by another terminal device. For example, the second terminal device may transmit the second indication information to the first terminal device, the second indication information includes at least one of the parameter information of the fourth sidelink reference signal, and the first terminal device determines the third indication information according to the second indication information, and transmit the third indication information to the third terminal device. Specifically, the third indication information may include at least one of the parameter information of the fourth sidelink reference signal. For example, the third indication information may include at least one of the following information of the fourth sidelink reference signal: SL-RSRP, SL-RSRQ, SL-RSSI and SINR, and the third indication information may also include the power headroom report of the first terminal device, so that the third terminal device can determine the power adjustment value of the first terminal device according to the third indication information.

Optionally, as shown in FIG. 6, the step of transmitting the third indication information may include: step S252, transmitting the third indication information, that is, the third terminal device may receive the third indication information directly or indirectly transmitted by the first terminal device. Specifically, similar to the second case in step S240 in the second embodiment, the first terminal device receives the third sidelink reference signal transmitted by the second terminal device, and determines the parameter information of the third sidelink reference signal. The parameter information of the third sidelink reference signal may include at least one of the following information of the third sidelink reference signal: SL-RSRP of the third sidelink reference signal, SL-RSRQ of the third sidelink reference signal, SL-RSSI of the third sidelink reference signal, and SINR of the third sidelink reference signal.

The first terminal device determines the third indication information according to the parameter information of the third sidelink reference signal, and the third indication information may include at least one of the following information of the third sidelink reference signal: SL-RSRP of the third sidelink reference signal, SL-RSRQ of the third sidelink reference signal, SL-RSSI of the third sidelink reference signal, and SINR of the third sidelink reference signal. The third terminal device determines the power adjustment value of the first terminal device according to the third indication information.

It should be understood that the third sidelink reference signal may be any sidelink reference signal, for example, the third sidelink reference signal may be PSCCH-DMRS; or, the third sidelink reference signal may also be PSSCH-DMRS; or the third sidelink reference signal may also be SL CSI-RS, but the disclosure is not limited thereto.

It should be understood that, in the foregoing step S251 or step S252, the third terminal device receives the third indication information, and may determine the power adjustment value according to the third indication information. For example, the third terminal device may determine the SINR of the fourth sidelink reference signal received by the second terminal device according to the fourth SL-RSRP in combination with the fourth SL-RSRQ and/or the fourth SL-RSSI. The third terminal device determines the power adjustment value of the first terminal device according to the SINR expected by the second terminal device, so as to satisfy the SINR expected by the second terminal device when receiving the sidelink data.

Optionally, the first terminal device transmits a PHR to the third terminal device, and the PHR may indicate the value range within which the transmission power of the first terminal device can be increased or decreased, so that the third terminal device can further determine the power adjustment value of the first terminal device according to the information.

It should be understood that the power adjustment value determined by the third terminal device is similar to step S211. In step S213, the third terminal device indicates the power adjustment value through power indication information transmitted to the first terminal device, and the power adjustment value may be a specific value, or the power adjustment value may also include a power adjustment range, and the first terminal device may determine the transmission power based on the power adjustment range, and the disclosure is not limited thereto.

In addition, similar to step S211, in step S212, the power indication information in the embodiment of the disclosure is used to indicate the power adjustment value, which may include any of the following situations: the power indication information may include the index of the power adjustment value; or, the power indication information may also include the power adjustment value itself, or, the power indication information may also include the quantized value of the power adjustment value. In addition, the power adjustment value indicated by the power indication information may be an adjustment value required when the first terminal device determines the transmission power, that is, the first terminal device increases or decreases the current power value to obtain the transmission power according to the power adjustment value. Alternatively, the power adjustment value indicated by the power indication information may also be the adjusted transmission power value, that is, the third terminal device instructs the first terminal device to transmit the transmission power value for transmitting the sidelink data or the sidelink reference signal through the power indication information, the disclosure is not limited thereto.

As shown in FIG. 6, corresponding to step S220 of the method 200 in FIG. 3, the method 200 may include: step S223, determining a power adjustment value, that is, the first terminal device determines the power adjustment value according to the power indication information transmitted by the third terminal device.

Specifically, according to the description in step S213, the method in which the power indication information indicates the power adjustment value may include any of a variety of situations. Therefore, in step S222, the first terminal device may determine the corresponding power adjustment value according to the indication method of the power indication information. For example, the power indication information may include the index of the power adjustment value, and the first terminal device may determine the power adjustment value corresponding to the index value included in the power indication information according to the corresponding relationship between the power adjustment value and the index.

In another example, if the power indication information may also include the quantized value of the power adjustment value, the first terminal device may determine the corresponding power adjustment value through quantization processing.

As shown in FIG. 6, the method 200 may include: step S233, transmitting sidelink data, that is, the first terminal device adjusts the transmission power according to the power adjustment value determined in step S223, and uses the adjusted transmission power to transmit the sidelink data or the first sidelink reference signal to the second terminal device.

Specifically, if the power adjustment value is a certain specific value, the first terminal device can determine the transmission power according to the value; if the power adjustment value is a certain range, the first terminal device can select an appropriate value within the range to determine the transmission power, and the disclosure is not limited thereto.

In addition, the first terminal device determines the transmission power based on the meaning of the power adjustment value. For example, if the power adjustment value is the adjustment value required when the first terminal device determines the transmission power, the first terminal device increases or decreases the current power value according to the power adjustment value to obtain the transmission power; or, the power adjustment value indicated by the power indication information may also be the adjusted transmission power value, and the first terminal device may determine the power adjustment value as the transmission power value used for transmitting the sidelink data or the sidelink reference signal.

In this embodiment of the disclosure, the first terminal device uses the initial transmission power to transmit the fourth sidelink reference signal. Correspondingly, in step S233, the first terminal device can adjust the initial transmission power according to the determined power adjustment value, for example, by increasing or decreasing the initial transmission power, or adjust the initial transmission power to the power adjustment value indicated by the power indication information, and use the adjusted transmission power to transmit the sidelink data or the sidelink signals to the second terminal device.

Therefore, in the embodiment of this disclosure, the head terminal configures the transmission power of the sending terminal according to the sidelink path loss, SL-RSRP, SL-RSRQ, SL-RSSI, SINR and other information reported by the receiving terminal or the sending terminal, so as to ensure that the receiving terminal obtains the desired SINR when receiving the sidelink data or the sidelink signals.

Figure 7:
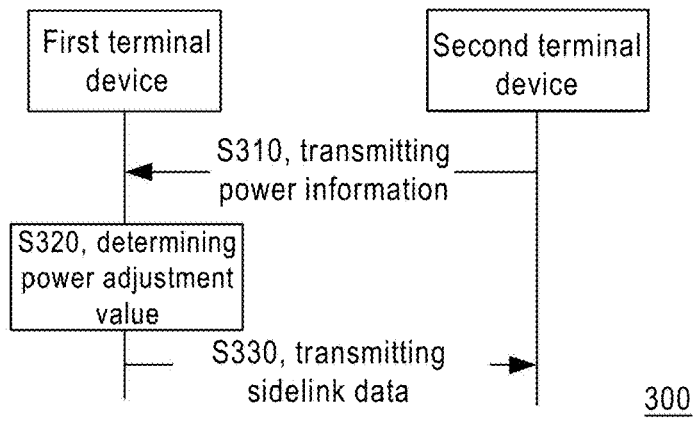
FIG. 7 is still another schematic diagram of a method for transmitting sidelink data embodied in an embodiment of the disclosure.

The foregoing describes the details of the method 200 for transmitting sidelink data according to an embodiment of the disclosure in conjunction with FIG. 3 to FIG. 6, and the following describes another method for transmitting sidelink data according to an embodiment of the disclosure in conjunction with FIG. 7.

FIG. 7 shows a schematic flowchart of a method 300 for transmitting sidelink data according to an embodiment of the disclosure. As shown in FIG. 7, the method 300 includes: step S310, transmitting power information. The first terminal device receives power information transmitted by the second terminal device, and the power information includes parameters that are used when the second terminal device receives the first sidelink reference signal. The first sidelink reference signal may refer to any sidelink reference signal.

It should be understood that the first terminal device and the second terminal device in the embodiment of the disclosure may refer to any two terminal devices that perform transmission of sidelink. For example, the first terminal device or the second terminal device may refer to any terminal device shown in FIG. 1 and FIG. 2, and the disclosure is not limited thereto.

It should be understood that the power information may include at least two of the following information of the first sidelink reference signal: SL-RSRP of the first sidelink reference signal, SL-RSRQ of the first sidelink reference signal, SL-RSSI of the first sidelink reference signal, and SINR of the first sidelink reference signal.

Specifically, the method 300 further includes: the first terminal device uses the initial transmission power to transmit the first sidelink reference signal to the second terminal device, so that the second terminal device determines the power information according to the first sidelink reference signal.

It should be understood that the first sidelink reference signal may be any sidelink reference signal. For example, the first sidelink reference signal may be PSCCH-DMRS; or, the first sidelink reference signal may also be PSSCH-DMRS; or, the first sidelink reference signal may also be SL CSI-RS, but the disclosure is not limited thereto.

Optionally, the power information in the embodiment of the disclosure may be carried in PSSCH, that is, the second terminal device may transmit the power information through PSSCH. Optionally, the power information in the embodiment of the disclosure can be carried in PSCCH, that is, the second terminal device can transmit the power information through the Sidelink Control Information (SCI) carried by PSCCH.

It should be understood that if the first terminal device only obtains the first SL-RSRP of the first sidelink reference signal received by the second terminal device, the transmission power adjusted by the first terminal device can only compensate for the loss caused by the path loss, that is, only the receiving power of the receiving terminal can be ensured, but it cannot be guaranteed that the receiving terminal can have the required SINR for demodulating data, because the first terminal device of the sending terminal does not know the interference level of the receiving terminal.

Therefore, the power information transmitted by the second terminal device acquired by the first terminal device includes at least two of the first SL-RSRP, the first SL-RSRQ, the first SL-RSSI, and the first SINR.

Correspondingly, as shown in FIG. 7, the method 300 further includes: step S320, determining a power adjustment value. The first terminal device determines the power adjustment value according to the power information. Specifically, the first terminal device determines the SINR for the second terminal device of the received first sidelink reference signal according to the power information; the first terminal device determines the power adjustment value according to the SINR.

Specifically, the first terminal device can calculate the SINR for the second terminal device of the received first sidelink reference signal according to the power information transmitted by the second terminal device. Then, according to the level of modulation and coding scheme (MCS) of the data to be transmitted and the SINR required by the second terminal device of the receiving terminal for demodulating the sidelink data corresponding to the MCS, it is possible to determine the adjustment value of the transmission power of the first terminal device.

For example, the first terminal device transmits sidelink data with power P1. The first terminal device can calculate that the SINR (denoted as SINR_rx) for the second terminal device of the receiving terminal to receive the first sidelink reference signal is 10 dB according to the SL-RSRP, SL-RSSI, and SL-RSRQ feedback from the second terminal device. In addition, the MCS level of the data to be transmitted of the first terminal device is 15, and the second terminal device of the receiving terminal detects that the SINR (denoted as SINR req) required by the sidelink data is 15 dB with a 99% probability of successful detection. Then the first terminal device needs to increase the transmission power to P2, that is, P2=P1+5 dB, that is, the power adjustment value is 5 dB.

As shown in FIG. 7, the method 300 further includes: step S330, transmitting sidelink data. The first terminal device adjusts the transmission power for transmitting the sidelink data or the second sidelink reference signal to the second terminal device according to the power adjustment value. Specifically, the first terminal device adjusts the initial transmission power for transmitting the first sidelink reference signal to the second terminal device according to the power adjustment value. The first terminal device uses the adjusted transmission power to transmit the sidelink data or the sidelink signal to the second terminal device, for example, the sidelink signal can be any sidelink reference signal.

Therefore, in the embodiment of disclosure, the receiving terminal transmits SL-RSRP, SL-RSRQ, SL-RSSI, SINR and other information to the sending terminal. The sending terminal can determine the SINR for the receiving terminal of the received sidelink data, and adjust the transmission power accordingly, so as to ensure that the receiving terminal obtains the desired SINR when receiving sidelink data.

It should be understood that the method 200 and the method 300 in the embodiment of the disclosure can be adopted separately or in combination. For example, the power indication information transmitted by the second terminal device of the receiving terminal to the first terminal device of the sending terminal includes SL-RSRP, SL-RSSI, SL-RSRQ, and the power adjustment value. Then, the first terminal device of the sending terminal determines the SINR of the receiving terminal according to SL-RSRP, SL-RSSI or SL-RSRQ, and the power adjustment value can be used to determine the amount of power that needs to be adjusted, but the disclosure is not limited thereto.

It should be understood that in the various embodiments of the disclosure, sequence number for denoting the above-mentioned processes does not mean the order of execution. The execution order of each process should be determined by its function and internal logic, and should not be construed as a limitation to the implementation process in the embodiments of the disclosure.

The method for transmitting sidelink data according to the embodiment of the disclosure is described in detail above in conjunction with FIG. 1 to FIG. 7, and the terminal device and the network device according to the embodiment of the disclosure will be described below in conjunction with FIG. 8 to FIG. 12.

Figures 8, 9:
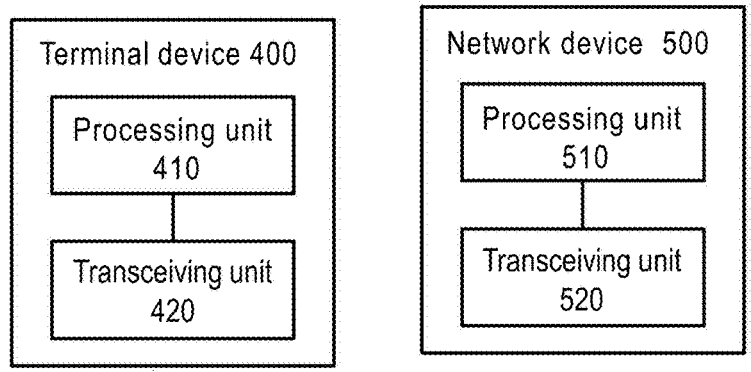
FIG. 8 is a schematic block diagram of a terminal device embodied in an embodiment of the disclosure.
FIG. 9 is a schematic block diagram of a network device embodied in an embodiment of the disclosure.

As shown in FIG. 8, the terminal device 400 in the embodiment of the disclosure includes: a processing unit 410 and a transceiving unit 420.

Optionally, the terminal device 400 may be used to execute the method 200 in the embodiment of the disclosure. For example, the terminal device 400 may be the first terminal device in the method 200. Specifically, the transceiving unit 420 is configured to: receive power indication information, and the power indication information is used to indicate a power adjustment value. The processing unit 410 is configured to adjust the transmission power for transmitting the sidelink data or the first sidelink reference signal to the second terminal device according to the power adjustment value.

Optionally, in an embodiment, the transceiving unit 420 is configured to receive the power indication information transmitted by the second terminal device.

Optionally, in an embodiment, the transceiving unit 420 is further configured to: use the initial transmission power to transmit a second sidelink reference signal to the second terminal device, and the second sidelink reference signal is used for the second terminal device to determine the power adjustment value.

Optionally, in an embodiment, the transceiving unit 420 is further configured to: receive at least one sidelink CQI transmitted by the second terminal device, and the CQI includes at least one power adjustment value corresponding to each sidelink CQI in the at least one sidelink CQI.

Optionally, in an embodiment, the transceiving unit 420 is configured to receive the power indication information transmitted by a network device.

Optionally, in an embodiment, the transceiving unit 420 is further configured to receive downlink control information transmitted by the network device, and the downlink control information includes the power indication information.

Optionally, in an embodiment, the transceiving unit 420 is further configured to: transmit first indication information to the network device, and the first indication information includes at least one of the following information: sidelink reference signal received power, sidelink reference signal received quality, sidelink reference signal strength indicator, SINR and power headroom report.

Optionally, in an embodiment, the transceiving unit 420 is further configured to: receive second indication information transmitted by the second terminal device, and the second indication information includes at least one of the following information: the sidelink reference signal received power, the sidelink reference signal received quality, the sidelink reference signal strength indicator, and the SINR. The processing unit 410 is further configured to: determine the first indication information according to the second indication information.

Optionally, in an embodiment, the transceiving unit 420 is further configured to: receive a third sidelink reference signal transmitted by the second terminal device. The processing unit 410 is further configured to: determine the first indication information according to the third sidelink reference signal.

Optionally, in an embodiment, the transceiving unit 420 is configured to: receive the power indication information transmitted by a third terminal device, and the third terminal device is the head terminal of the communication group where the terminal device and the second terminal device are located.

Optionally, in an embodiment, the transceiving unit 420 is configured to receive a sidelink channel transmitted by the third terminal device, and the sidelink channel includes the power indication information.

Optionally, in an embodiment, the transceiving unit 420 is further configured to: transmit third indication information to the third terminal device, and the third indication information includes at least one of the following information: sidelink reference signal received power, sidelink reference signal received quality, sidelink reference signal strength indicator, SINR and power headroom report.

Optionally, in an embodiment, the transceiving unit 420 is further configured to: receive second indication information transmitted by the second terminal device, and the second indication information includes at least one of the following information: the sidelink reference signal received power, the sidelink reference signal received quality, the sidelink reference signal strength indicator, and the SINR. The processing unit 410 is further configured to: determine the third indication information according to the second indication information.

Optionally, in an embodiment, the transceiving unit 420 is further configured to: use the initial transmission power to transmit a fourth sidelink reference signal to the second terminal device, and the fourth sidelink reference signal is used for the second terminal device to determine the second indication information.

Optionally, in an embodiment, the transceiving unit 420 is further configured to: receive a third sidelink reference signal transmitted by the second terminal device. The processing unit 410 is further configured to: determine the third indication information according to the third sidelink reference signal.

Optionally, in an embodiment, the processing unit 410 is configured to: adjust the initial transmission power according to the power adjustment value; the transceiving unit 420 is further configured to: use the adjusted transmission power to transmit the sidelink data or the first sidelink reference signal to the second terminal device.

It should be understood that the foregoing and other operations and/or functions of each unit in the terminal device 400 are used to implement the corresponding process of the first terminal device in the method 200 in FIG. 1 to FIG. 6. For conciseness, no further description is incorporated herein.

Optionally, the terminal device 400 may be used to execute the method 200 in the embodiment of the disclosure. For example, the terminal device 400 may also be the second terminal device in the method 200. Specifically, the transceiving unit 420 is configured to: transmit power indication information to the first terminal device. The power indication information is used to indicate a power adjustment value, and the power adjustment value is used for the first terminal device to adjust the transmission power for transmitting the sidelink data or the first sidelink reference signal. The transceiving unit 420 is further configured to: receive the sidelink data or the first sidelink reference signal transmitted by using the transmission power adjusted by the first terminal device.

Optionally, in an embodiment, the transceiving unit 420 is further configured to: transmit at least one sidelink CQI to the first terminal device. The power indication information includes at least one power adjustment value corresponding to each sidelink CQI in the at least one sidelink CQI.

Optionally, in an embodiment, the transceiving unit 420 is further configured to: receive a second sidelink reference signal transmitted by the initial transmission power adopted by the first terminal device. The processing unit 410 is configured to: determine the power adjustment value according to the second sidelink reference signal.

Optionally, in an embodiment, the processing unit 410 is configured to determine power information according to the second sidelink reference signal, and the power information includes at least one of the following information of the first sidelink reference signal: sidelink reference signal received power, sidelink reference signal received quality, sidelink reference signal strength indicator, and SINR; and determine the power adjustment value according to the power information.

Optionally, in an embodiment, the processing unit 410 is configured to: determine the SINR when receiving the second sidelink reference signal according to the power information; and determine the power adjustment value according to the SINR when receiving the second sidelink reference signal.

It should be understood that the foregoing and other operations and/or functions of each unit in the terminal device 400 are used to implement the corresponding process of the second terminal device in the method 200 in FIG. 1 to FIG. 6. For conciseness, no further description is incorporated herein.

Optionally, the terminal device 400 may be used to execute the method 200 in the embodiment of the disclosure. For example, the terminal device 400 may also be the third terminal device in the method 200. Specifically, the transceiving unit 420 is configured to: transmit power indication information to the first terminal device. The power indication information is used to indicate a power adjustment value, and the power adjustment value is used for the first terminal device to adjust the transmission power for transmitting the sidelink data or the first sidelink reference signal to the second terminal device. The third terminal device is the head terminal of the communication group where the first terminal device and the second terminal device are located.

Optionally, in an embodiment, the transceiving unit 420 is further configured to transmit a sidelink channel to the first terminal device, and the sidelink channel includes the power indication information.

Optionally, in an embodiment, the transceiving unit 420 is further configured to: receive the third indication information transmitted by the first terminal device or the second terminal device. The third indication information includes at least one of the following information in the third sidelink reference signal or the fourth sidelink reference signal: sidelink reference signal received power, sidelink reference signal received quality, sidelink reference signal strength indicator, and SINR. The third sidelink reference signal is transmitted by the second terminal device to the first terminal device. The fourth sidelink reference signal is transmitted by the first terminal device to the second terminal device. The processing unit 410 is configured to: determine the power adjustment value according to the third indication information.

Optionally, in an embodiment, the processing unit 410 is configured to determine the SINR for the first terminal device or the second terminal device of a received sidelink reference signal according to the third indication information; determine the power adjustment value according to the SINR when receiving the sidelink reference signal.

It should be understood that the foregoing and other operations and/or functions of each unit in the terminal device 400 are used to implement the corresponding process of the third terminal device in the method 200 in FIG. 1 to FIG. 6. For conciseness, no further description is incorporated herein.

Optionally, the terminal device 400 may also be used to execute the method 300 of the embodiment of the disclosure. For example, the terminal device 400 may be the first terminal device in the method 300. Specifically, the transceiving unit 420 is configured to receive power information transmitted by the second terminal device. The power information includes at least two of the following information of the first sidelink reference signal: sidelink reference signal received power, sidelink reference signal received quality, sidelink reference signal strength indicator and SINR. The processing unit 410 is configured to: determine a power adjustment value according to the power information. The processing unit 410 is further configured to: adjust the transmission power for transmitting the sidelink data or the second sidelink reference signal to the second terminal device according to the power adjustment value.

Optionally, in an embodiment, the transceiving unit 420 is further configured to: use initial transmission power to transmit the first sidelink reference signal to the second terminal device, and the first sidelink reference signal is used for the second terminal device to determine the power information.

Optionally, in an embodiment, the processing unit 410 is configured to: determine the SINR for the second terminal device of the received first sidelink reference signal according to the power information; determine the power adjustment value according to SINR.

Optionally, in an embodiment, the processing unit 410 is configured to: adjust the initial transmission power according to the power adjustment value. The transceiving unit 420 is further configured to: use the adjusted transmission power to transmit the sidelink data or the second sidelink reference signal to the second terminal device.

It should be understood that the foregoing and other operations and/or functions of each unit in the terminal device 400 are used to implement the corresponding process of the first terminal device in the method 300 in FIG. 7. For conciseness, no further description is incorporated herein.

Optionally, the terminal device 400 may also be used to execute the method 300 of the embodiment of the disclosure. For example, the terminal device 400 may also be the second terminal device in the method 300. Specifically, the transceiving unit 420 is configured to receive the first sidelink reference signal transmitted by the initial transmission power adopted by the first terminal device. The processing unit 410 is configured to determine power information. The power information includes at least one of the following information of the first sidelink reference signal: sidelink reference signal received power, sidelink reference signal received quality, sidelink reference signal strength indicator, and SINR. The transceiving unit 420 is further configured to: transmit the power information to the target device. The power information is used for the target device to determine a power adjustment value. The power adjustment value is used for the first terminal device to adjust the transmission power for transmitting sidelink data or a second sidelink reference signal to the transceiving unit 420. The target device includes at least one of the first terminal device, a network device, and a third terminal device, and the third terminal device is a head terminal of a communication group where the first terminal device and the terminal device are located.

It should be understood that the foregoing and other operations and/or functions of each unit in the terminal device 400 are used to implement the corresponding process of the second terminal device in the method 300 in FIG. 7. For conciseness, no further description is incorporated herein.

Therefore, for the terminal device of the sending terminal, the terminal device of the embodiment of disclosure can receive the transmission power configured by the terminal device of receiving terminal, the network device, or the head terminal device. The transmission power is determined by the terminal device of the receiving terminal, the network device, or head terminal device according to the reported sidelink path loss, SL-RSRP, SL-RSRQ and other information, so as to ensure that the receiving terminal obtains the desired SINR when receiving sidelink data or sidelink signals. Or, the receiving terminal transmits SL-RSRP, SL-RSRQ, SL-RSSI, and other information to the sending terminal. The sending terminal can determine the SINR for the receiving terminal of a received sidelink data, and adjust the transmission power accordingly to ensure that the receiving terminal receives the desired SINR when receiving the sidelink data.

As shown in FIG. 9, the network device 500 in the embodiment of the disclosure includes: a processing unit 510 and a transceiving unit 520. Specifically, the transceiving unit 520 is configured for: transmitting the power indication information to the first terminal device. The power indication information is used for indicating a power adjustment value. The power adjustment value is used for the first terminal device to adjust the transmission power for transmitting the sidelink data or the first sidelink reference signal to the second terminal device.

Optionally, in an embodiment, the transceiving unit 520 is further configured to: receive first indication information transmitted by the first terminal device or the second terminal device. The first indication information includes at least one of the following information in the third sidelink reference signal or the fourth sidelink reference signal: sidelink reference signal received power, sidelink reference signal received quality, sidelink reference signal strength indicator, SINR, and power headroom indicator. The third sidelink reference signal is transmitted by the second terminal device transmits to the first terminal device, and the fourth sidelink reference signal is transmitted by the first terminal device to the second terminal device. The processing unit 510 is configured to: determine the power adjustment value according to the first indication information.

Optionally, in an embodiment, the processing unit 510 is configured to: determine the SINR for the first terminal device or the second terminal device of a received sidelink reference signal according to the first indication information; determine the power adjustment value according to the SINR when receiving the sidelink reference signal.

Optionally, in an embodiment, the processing unit 510 is configured to: the network device transmits downlink control information to the first terminal device, and the downlink control information includes the power indication information.

It should be understood that the foregoing and other operations and/or functions of each unit in the terminal device 500 are used to implement the corresponding process of the network device in various methods in FIG. 1 to FIG. 7. For conciseness, no further description is incorporated herein.

Therefore, the network device in the embodiment of this disclosure configures the transmission power of the terminal device of the sending terminal according to the sidelink path loss, SL-RSRP, SL-RSRQ and other information reported by the terminal device of the sending terminal or the terminal device of the receiving terminal, so as to ensure that the terminal device of the receiving terminal receives the desired SINR when receiving the sidelink data or the sidelink signal.

Figure 10:
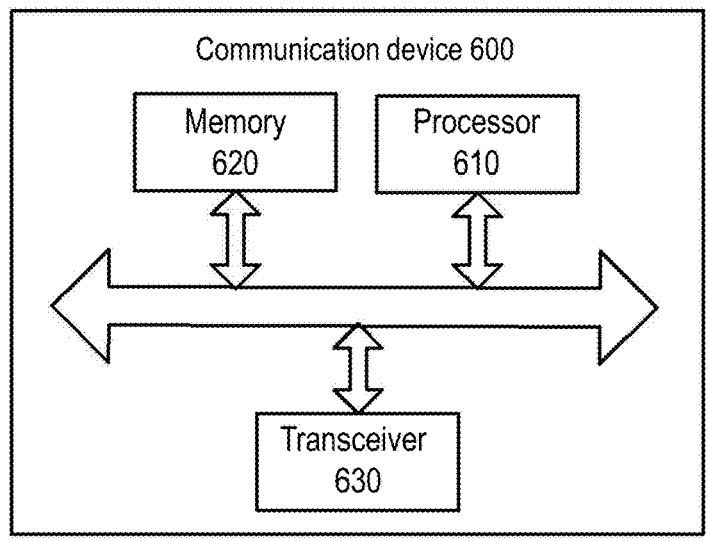
FIG. 10 is a schematic block diagram of a communication device embodied in an embodiment of the disclosure.

FIG. 10 is a schematic structural diagram of a communication device 600 provided by an embodiment of the disclosure. The communication device 600 shown in FIG. 10 includes a processor 610, and the processor 610 can invoke and run a computer program in the memory to implement the method in the embodiment of the disclosure.

Optionally, as shown in FIG. 10, the communication device 600 may further include a memory 620. The processor 610 can invoke and run a computer program in the memory 620 to implement the method in the embodiment of the disclosure.

The memory 620 may be a separate device independent of the processor 610, or may be integrated in the processor 610.

Optionally, as shown in FIG. 10, the communication device 600 may further include a transceiver 630, and the processor 610 may control the transceiver 630 to communicate with other devices. Specifically, the transceiver 630 may transmit information or data to other devices, or receive information or data transmitted by other devices.

The transceiver 630 may include a transmitter and a receiver. The transceiver 630 may further include an antenna, and the number of antennas may be one or more.

Optionally, the communication device 600 may specifically be a network device in an embodiment of the disclosure, and the communication device 600 may implement the corresponding processes implemented by the network device in various methods in the embodiments of the disclosure. For conciseness, no more details are described herein.

Optionally, the communication device 600 may specifically be a mobile terminal/terminal device according to an embodiment of the disclosure, and the communication device 600 may implement the corresponding process implemented by the mobile terminal/terminal device in various methods in the embodiment of the disclosure. For conciseness, no more details are described herein.

Figure 11:
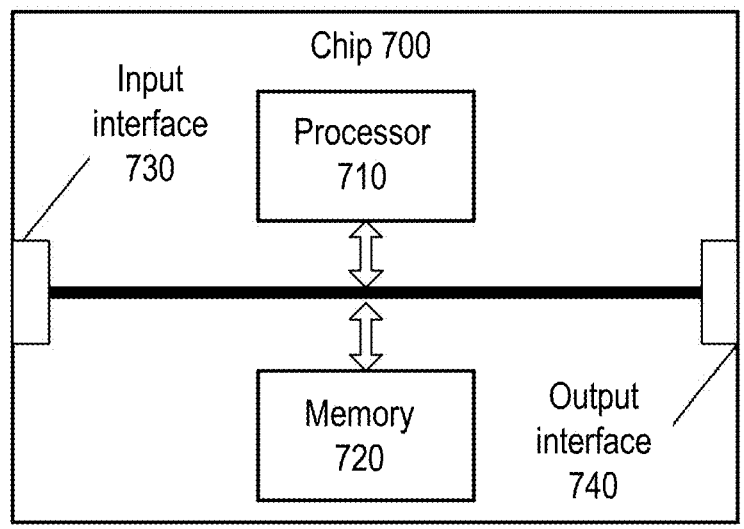
FIG. 11 is a schematic block diagram of a chip embodied in an embodiment of the disclosure.

FIG. 11 is a schematic structural diagram of a chip according to an embodiment of the disclosure. The chip 700 shown in FIG. 11 includes a processor 710, and the processor 710 can invoke and run a computer program in the memory to implement the method in the embodiment of the disclosure.

Optionally, as shown in FIG. 11, the chip 700 may further include a memory 720. The processor 710 can invoke and run a computer program in the memory 720 to implement the method in the embodiment of the disclosure.

The memory 720 may be a separate device independent of the processor 710, or may be integrated in the processor 710.

Optionally, the chip 700 may further include an input interface 730. The processor 710 can control the input interface 730 to communicate with other devices or chips, and specifically, can obtain information or data transmitted by other devices or chips.

Optionally, the chip 700 may further include an output interface 740. The processor 710 can control the output interface 740 to communicate with other devices or chips, and specifically, can output information or data to other devices or chips.

Optionally, the chip can be applied to the network device in the embodiments of the disclosure, and the chip can implement the corresponding processes implemented by the network device in the various methods of the embodiments of the disclosure. For conciseness, no more details are incorporated herein.

Optionally, the chip can be applied to the mobile terminal/terminal device in the embodiments of the disclosure, and the chip can implement the corresponding processes implemented by the mobile terminal/terminal device in the various methods of the embodiments of the disclosure. For conciseness, no more details are incorporated herein.

It should be understood that the chip in the embodiment of the disclosure may also be referred to as a system-level chip, a system chip, a chip system, or a system-on-chip and so on.

Figure 12:
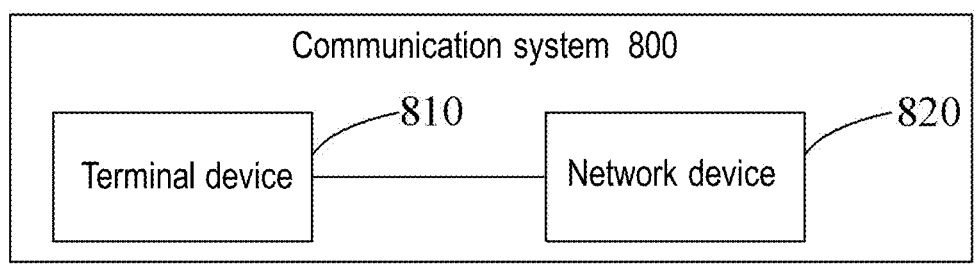
FIG. 12 is a schematic diagram of a communication system embodied in an embodiment of the disclosure.

FIG. 12 is a schematic block diagram of a communication system 800 provided by an embodiment of the disclosure. As shown in FIG. 12, the communication system 800 includes a terminal device 810 and a network device 820.

The terminal device 810 may be used to implement the corresponding functions implemented by various terminal devices in the foregoing method. For example, the terminal device 810 may be used to implement the corresponding functions of the first terminal device, the second terminal device, or the third terminal device. The network device 820 can be used to implement the corresponding functions implemented by the network device in the foregoing method. For conciseness, no more details are incorporated herein.

It should be understood that the processor in the embodiment of the disclosure may be an integrated circuit chip with signal processing capability. In the implementation process, the steps described in the above method embodiments can be completed by hardware integrated logic circuits in the processor or instructions in the form of software. The above-mentioned processor may be a general-purpose processor, a digital signal processor (DSP), an application specific integrated circuit (ASIC), a field programmable gate array (FPGA), or other programmable logic devices, discrete gates or transistor logic devices, discrete hardware components, which is capable of implement or execute the methods, steps, and logical block diagrams disclosed in the embodiments of the disclosure. The general-purpose processor may be a microprocessor or the processor may also be any conventional processor or the like. The steps of the method disclosed in the embodiments of the disclosure can be directly embodied as being executed by a hardware decoding processor, or executed by a combination of hardware and software modules in the decoding processor. The software module can be located in random memory, flash memory, read-only memory, programmable read-only memory, or electrically readable and writable programmable memory, registers, and other well-developed storage media in the field. The storage medium is located in the memory, and the processor reads the information in the memory and completes the steps of the above method in combination with its hardware.

It can be understood that the memory in the embodiments of the disclosure may be volatile memory or non-volatile memory, or may include both volatile and non-volatile memory. Specifically, non-volatile memory can be read-only memory (ROM), programmable ROM (PROM), erasable PROM (EPROM), electrically EPROM (EEPROM) or flash memory. The volatile memory may be a random access memory (RAM), which is used as an external cache memory. By way of exemplary but not restrictive description, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM) and direct rambus RAM (DR RAM). It should be noted that the memory of the systems and methods described herein is intended to include but not limited to these and any other suitable types of memory.

It should be understood that the above-mentioned memory is exemplary but not restrictive. For example, the memory in the embodiment of the disclosure may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), and Direct Rambus RAM (DR RAM), etc. That is to say, the memory in the embodiments of the disclosure is intended to include but not limited to these and any other suitable types of memory.

The embodiment of the disclosure further provides a computer-readable storage medium for storing computer programs.

Optionally, the computer-readable storage medium can be applied to the network device in the embodiment of the disclosure, and the computer program enables the computer to execute the corresponding process implemented by the network device in various methods in the embodiment of the disclosure. For conciseness, no more details are incorporated herein.

Optionally, the computer-readable storage medium can be applied to the mobile terminal/terminal device in the embodiments of this disclosure, and the computer program enables the computer to execute the corresponding processes implemented by the mobile terminal/terminal device in the various methods of the embodiments of this disclosure. For conciseness, no more details are incorporated herein.

The embodiment of the disclosure further provides a computer program product, including computer program instructions.

Optionally, the computer program product can be applied to the network device in the embodiment of this disclosure, and the computer program instructions enable the computer to execute the corresponding process implemented by the network device in various methods of the embodiment of this disclosure. For conciseness, no more details are incorporated herein.

Optionally, the computer program product can be applied to the mobile terminal/terminal device in the embodiment of this disclosure, and the computer program instructions enable the computer to execute the corresponding process implemented by the mobile terminal/terminal device in various methods of the embodiment of this disclosure. For conciseness, no more details are incorporated herein.

The embodiment of the disclosure further provides a computer program.

Optionally, the computer program can be applied to the network device in the embodiment of the disclosure. When the computer program is run on the computer, the computer is enabled to execute the corresponding processes implemented by the network device in the various methods of the embodiments of the disclosure. For conciseness, no more details are incorporated herein.

Optionally, the computer program can be applied to the mobile terminal/terminal device in the embodiments of this disclosure. When the computer program is run on the computer, the computer is enabled to execute the corresponding processes implemented by the mobile terminal/terminal device in the various methods of the embodiments of the disclosure. For conciseness, no more details are incorporated herein.

Those of ordinary skill in the art may realize that the units and algorithm steps described in the examples in combination with the embodiments disclosed herein can be implemented by electronic hardware or a combination of computer software and electronic hardware. Whether these functions are implemented in hardware or software depends on the specific application and design requirement of the technical solution. Practitioners and technicians can use different methods for each specific application to implement the described functions, but such implementation should not be considered as extending beyond the scope of this disclosure.

Those skilled in the art can clearly understand that, for the convenience and conciseness of the description, the specific working process of the system, device and unit described above can be derived from the corresponding process in the foregoing method embodiment, and no more details are incorporated herein.

In the several embodiments provided in this disclosure, it should be understood that the disclosed system, device, and method may be implemented in other ways. For example, the device embodiments described above are only illustrative. For example, the division of the units is only a division of logical function, and there may be other divisions in actual implementation, for example, multiple units or elements may be combined or may be integrated into another system, or some features can be ignored or not implemented. In addition, the mutual coupling or direct coupling or communication connection that is shown or discussed may be indirect coupling or communication connection achieved through some interfaces, devices or units, and may be in electrical, mechanical or other forms.

The units described as separate components may or may not be physically separated, and the components displayed as units may or may not be physical units, that is, they may be located in one place, or they may be distributed to multiple network units. Some or all of the units may be selected according to actual needs to achieve the objectives of the solutions of the embodiments.

In addition, the functional units in the various embodiments of the disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, essentially the technical solution of the disclosure, or the part that contributes to the existing technology or the part of the technical solution can be embodied in the form of a software product, and the computer software product is stored in a storage medium, including several instructions that are used to enable a computer device (which may be a personal computer, a server, or a network device, etc.) to execute all or part of the steps of the methods described in the various embodiments of the disclosure. The aforementioned storage media include: U disk, removable hard disk, Read-Only Memory (ROM), Random Access Memory (RAM), magnetic disks or optical disks, etc., which can store program codes.

The above are only specific implementations of this disclosure, but the protection scope of this disclosure is not limited thereto. Any person skilled in the art can easily think of changes or substitutions within the technical scope disclosed in this disclosure. The changes or substitutions should be covered within the scope of protection of this changes or substitutions. Therefore, the protection scope of this changes or substitutions should be subject to the protection scope of the claims.

What is claimed is:

1. A method for transmitting a sidelink data, comprising:
receiving, by a first terminal device, power indication information, wherein the power indication information is used to indicate a power adjustment value, a step in which the first terminal device receives the power indication information comprises:
receiving, by the first terminal device, the power indication information transmitted by a second terminal device;
receiving, by the first terminal device, at least one sidelink channel quality indicator (CQI) transmitted by the second terminal device, wherein the power indication information comprises at least one power adjustment value corresponding to each sidelink CQI in the at least one sidelink CQI;

the first terminal device adjusts a transmission power for transmitting the sidelink data or a first sidelink reference signal to the second terminal device according to the power adjustment value.

2. The method according to claim 1, wherein the method further comprises:
using, by the first terminal device, an initial transmission power to transmit a second sidelink reference signal to the second terminal device, wherein the second sidelink reference signal is used for the second terminal device to determine the power adjustment value.

3. The method according to claim 2, wherein a step in which the first terminal device adjusts the transmission power for transmitting the sidelink data or the first sidelink reference signal to the second terminal device according to the power adjustment value comprises:
adjusting, by the first terminal device, the initial transmission power according to the power adjustment value;
using, by the first terminal device, the adjusted transmission power to transmit the sidelink data or the first sidelink reference signal to the second terminal device.

4. The method according to claim 1, wherein a step in which the first terminal device receives the power indication information comprises:
receiving, by the first terminal device, the power indication information transmitted by a network device.

5. The method according to claim 4, wherein a step in which the first terminal device receives the power indication information transmitted by the network device comprises:
receiving, by the first terminal device, downlink control information transmitted by the network device, wherein the downlink control information comprises the power indication information.

6. The method according to claim 4, wherein the method further comprises:
transmitting, by the first terminal device, first indication information to the network device, wherein the first indication information comprises at least one of the following information: a sidelink reference signal received power, a sidelink reference signal received quality, a sidelink reference signal strength indicator, a signal to interference plus noise ratio (SINR) and a power headroom report.

7. The method according to claim 6, wherein the method further comprises:
receiving, by the first terminal device, second indication information transmitted by the second terminal device, wherein the second indication information comprises at least one of the following information: the sidelink reference signal received power, the sidelink reference signal received quality, the sidelink reference signal strength indicator, and the SINR;
determining, by the first terminal device, the first indication information according to the second indication information.

8. The method according to claim 6, wherein the method further comprises:
receiving, by the first terminal device, a third sidelink reference signal transmitted by the second terminal device;
determining, by the first terminal device, the first indication information according to the third sidelink reference signal.

9. A method for transmitting a sidelink data, comprising:
receiving, by a first terminal device, power information transmitted by a second terminal device, wherein the power information comprises at least two of the following information of a first sidelink reference signal: a sidelink reference signal received power, a sidelink reference signal received quality, a sidelink reference signal strength indicator, and an SINR;
determining, by the first terminal device, a power adjustment value according to the power information;
adjusting, by the first terminal device, a transmission power for transmitting a sidelink data or a second sidelink reference signal to the second terminal device according to the power adjustment value.

10. The method according to claim 9, wherein the method further comprises:
using, by the first terminal device, an initial transmission power to transmit the first sidelink reference signal to the second terminal device, the first sidelink reference signal is used for the second terminal device to determine the power information.

11. The method according to claim 10, wherein a step in which the first terminal device determines power adjustment value according to the power information comprises:
determining, by the first terminal device, the SINR for the second terminal device of the received first sidelink reference signal according to the power information;
determining, by the first terminal device, the power adjustment value according to SINR.

12. The method according to claim 10, wherein a step in which the first terminal device adjusts the transmission power for transmitting sidelink data or second sidelink reference signal to the second terminal device according to the power adjustment value comprises:
adjusting, by the first terminal device, the initial transmission power according to the power adjustment value;
using, by the first terminal device, the adjusted transmission power to transmit the sidelink data or the second sidelink reference signal to the second terminal device.

13. A terminal device, comprising:
a transceiver, configured to receive power indication information, wherein the power indication information is used to indicate a power adjustment value, and the transceiver is further configured to
receive the power indication information transmitted by a second terminal device;
receive at least one sidelink CQI transmitted by the second terminal device, and the CQI comprises at least one power adjustment value corresponding to each sidelink CQI in the at least one sidelink COI;
a processor, configured to adjust a transmission power for transmitting a sidelink data or a first sidelink reference signal to the second terminal device according to the power adjustment value.

14. The terminal device according to claim 13, wherein the transceiver is further configured to use an initial transmission power to transmit a second sidelink reference signal to the second terminal device, and the second sidelink reference signal is used for the second terminal device to determine the power adjustment value.

15. The terminal device according to claim 13, wherein the transceiver is configured to receive the power indication information transmitted by a network device.

16. The terminal device according to claim 15, wherein the transceiver is further configured to receive downlink control information transmitted by the network device, and the downlink control information comprises the power indication information.

\* \* \* \* \*